United States Patent

Asami et al.

Patent Number: 5,348,818
Date of Patent: Sep. 20, 1994

[54] CARBONACEOUS MATERIAL AND A CELL USING THE SAME

[75] Inventors: Keiichi Asami; Hideki Takahashi; Katsuo Inoue; Yoshiaki Echigo, all of Uji; Toshiyuki Ohsawa; Toshiyuki Kabata, both of Tokyo, all of Japan

[73] Assignees: Unitika Ltd., Hyogo; Ricoh Company, Ltd., Tokyo, both of Japan

[21] Appl. No.: 6,498

[22] Filed: Jan. 21, 1993

[30] Foreign Application Priority Data

Jan. 20, 1992 [JP] Japan .................. 4-007386
Feb. 18, 1992 [JP] Japan .................. 4-030729
Aug. 6, 1992 [JP] Japan .................. 4-210133
Aug. 6, 1992 [JP] Japan .................. 4-210134

[51] Int. Cl.$^5$ .............. H01M 4/60; H01M 4/58; C01B 31/02
[52] U.S. Cl. .................. 429/213; 429/218; 429/232; 423/445 R
[58] Field of Search .............. 429/218, 213, 232; 423/445

[56] References Cited

PUBLICATIONS

Sumitomo, Patent Abstracts of Japan, No. 61-277165 (May 2, 1987).
Kanebo, Patent Abstracts of Japan, No. 63-218158 (Jan. 10, 1989).
Kanebo, Patent Abstracts of Japan, No. 63-218160 (Jan. 10, 1989).
Kanebo, Patent Abstracts of Japan, No. 01-220372 (Nov. 29, 1989).
Matsushita, Patent Abstracts of Japan No. 63-218161 (Jan. 10, 1989).
Doege et al., Chemical Abstracts, 114:210626g (Jun. 3, 1991).
Bruck, Chemical Abstracts, 65:18759e (Dec. 5, 1966).
Simanovich et al., Chemical Abstracts, 111:174768g (Nov. 13, 1989).
Bruck, Chemical Abstracts, 63:14995b (Nov. 22, 1965).
Heacock et al., Chemical Abstracts, 63:742f (Jul. 5, 1965).

Primary Examiner—John S. Maples
Attorney, Agent, or Firm—Wenderoth, Lind & Ponack

[57] ABSTRACT

The present invention provides a carbonaceous material suitable for an electrode of a secondary cell. The carbonaceous material has a specific surface area by BET method of at least 10 m²/g and a nitrogen/carbon atom weight ratio of 0.15 to 0.01, and is obtained by heat-treating a polyimide polymer having repeating units represented by:

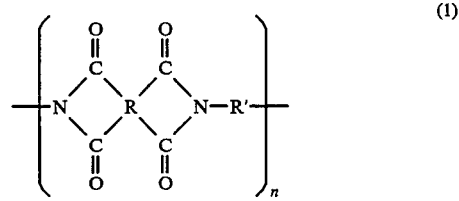

wherein R represents a 4 valent aromatic residue having at least one aromatic ring, of which each 2 valences are bonded with an adjacent carbon atom in the aromatic ring, R' represents a divalent aromatic residue having 1 to 4 aromatic rings and n is an integer of at least 2. The present invention also provides a secondary cell using the above mentioned carbonaceous material as electrode.

15 Claims, 1 Drawing Sheet

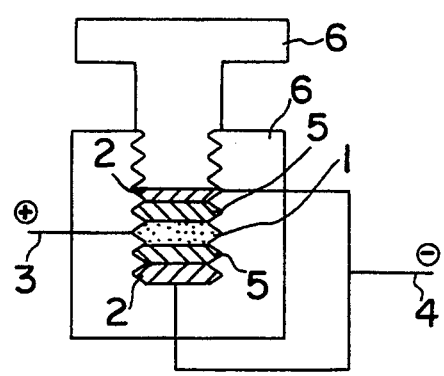
F I G. I

CARBONACEOUS MATERIAL AND A CELL USING THE SAME

FIELD OF THE INVENTION

The present invention relates to a carbonaceous material and a secondary cell using the same.

BACKGROUND OF THE INVENTION

Secondary cells have been employed everywhere in the world, and in order to give the cell high energy density and high power, electrodes of secondary cells have been intensely studied. For example, there have been proposed, as anode active materials, transition metal oxides or transition metal chalcogenates (e.g. $TiS_2$, $MoS_2$, $CoO_2$, $V_2O_5$, $FeS_2$, $NbS_2$, $ZrS_2$, $NiPS_3$, $VSe_2$, $MnO_2$ etc.), heat polymerizates of organic materials (e.g. one-dimension graphitizate, fluorinated carbon, graphite etc.) and electroconductive polymers (e.g. polyacetylene, polypyrrole, polyaniline, polyazulene etc.). Also, non-hydrogen cells or capacitors using lithium, lithium alloy or graphite as cathode are proposed, because they give the cells light weight and high energy density in comparison with conventional cells.

However, when lithium metal is used as cathode, the lithium metal dissolves into electrolyte as lithium ion upon discharging and the lithium ion upon charging in turn deposits on the cathode. When this charge and discharge cycle is repeated many times, the deposited lithium metal grows as dendrite form and may reach the anode to shortcut. The shortcut often reduces the charge and discharge cycle. In order to overcome the problem, many solutions have been proposed.

For example, Japanese Kokai Publication 62-243247 suggests that a lithium metal plate which is sandwiched between two aluminum plates is used as cathode for the secondary cells. This reduces the formation of dendrite, but the surface area of the cathode reduces and the charge and discharge capacity also reduces. Japanese Kokai Publication 1-63268 discloses that, in order to increase the surface area of the cathode, porous Li-Al alloy with a pore size of $5\mu$ or more is used as cathode. The pore size of the porous Li-Al alloy, however, is large enough to have poor mechanical strength and the alloy easily breaks when mounting into the cells.

It is also proposed that lithium is doped into a carbonaceous material to form a cathode. For example, Japanese Kokai Publications 62-122066 and 62-90863 suggest carbonaceous material which is obtained by carbonizing organic material. The carbonaceous material is doped with lithium to form an electrode which, however, does not have enough dope amount and has poor performance. In order to improve the above problems, Japanese Kokai Publication 3-13710 provides a method for producing a cathode electrode wherein a carbonaceous material which is produced by carbonizing furan resin to which a phosphorus compound is added, is powdered and dispersed in an organic solvent together with poly(vinylidene fluoride) powder, which is then coated on stainless steel with removing the organic solvent and compression-molded. The resulting electrode, however, does not have sufficient performance.

Japanese Kokai Publication 61-277165 discloses a graphite which is obtained by heat-treating aromatic polyimide at a temperature of 2,000° to 8,500° C. in inert atmosphere. The graphite is suggested for use as at least one of the electrodes of a secondary cell. The graphite, however, has poor charge-discharge capacity and coulomb efficiency.

SUMMARY OF THE INVENTION

The present invention provides a carbonaceous material suitable for an electrode of a secondary cell. Accordingly, the present invention provides a carbonaceous material having a specific surface area by BET method of at least 10 m²/g and a nitrogen/carbon atom weight ratio of 0.15 to 0.01, obtained by heat-treating a polyimide polymer having repeating units represented by:

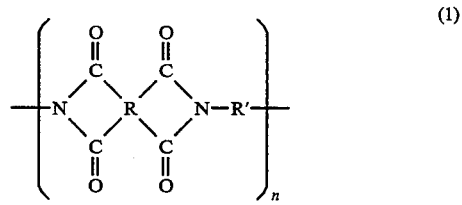

(1)

wherein R represents a 4 valent aromatic residue having at least one aromatic ring, of which each 2 valences are bonded with an adjacent carbon atom in the aromatic ring, R' represents a divalent aromatic residue having 1 to 4 aromatic rings and n is an integer of at least 2 (first invention).

The present invention also provides a secondary cell using the above mentioned carbonaceous material as electrode (second invention).

DETAILED DESCRIPTION OF THE INVENTION

The polyimide polymer has the repeating unit represented by the formula (1), wherein n is an integer of at least 2, preferably 10 to 500, mere preferably 30 to 300. In the formula (1), R represents a 4 valent aromatic residue having at least one aromatic ring, of which each 2 valences are bonded with an adjacent carbon atom in the aromatic ring, for example

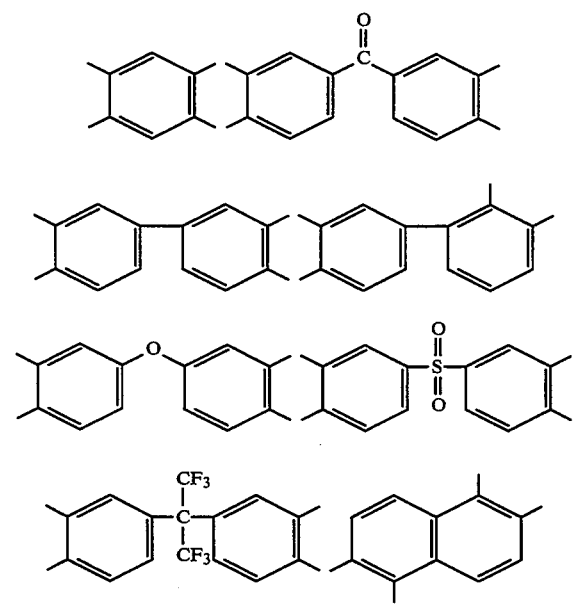

R' represents a divalent aromatic residue having 1 to 4 aromatic rings, for example

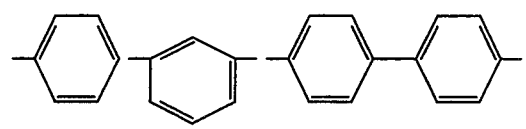

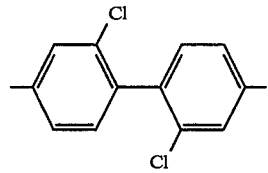

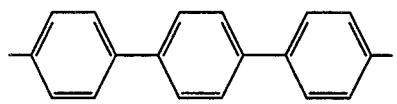

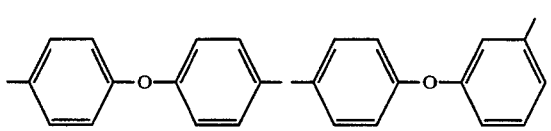

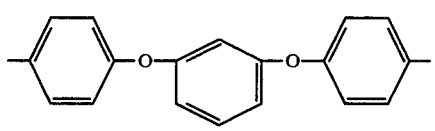

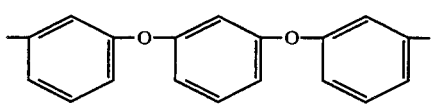

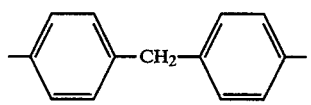

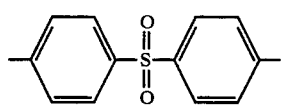

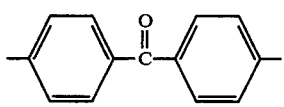

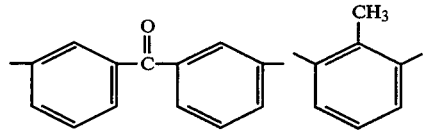

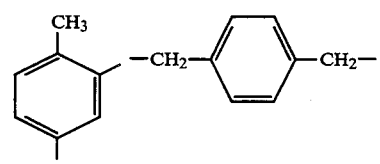

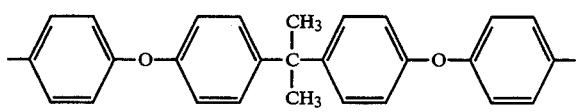

-continued

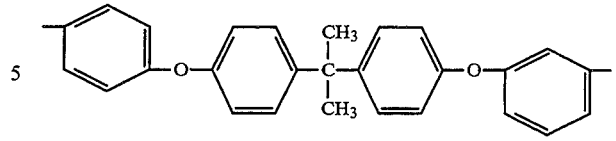

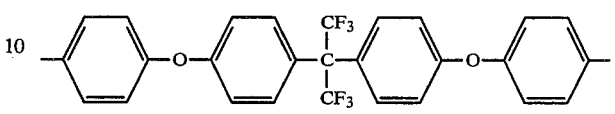

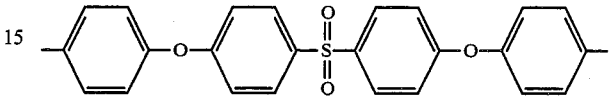

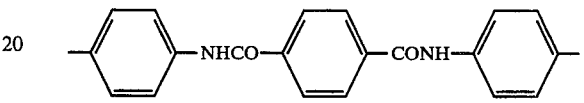

Preferably, R is

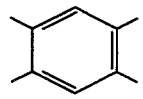

and R' is

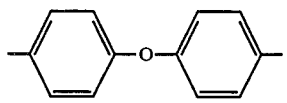

It is preferred that the polyimide polymer is firstly formed into powder, fiber, film, plate or a composite thereof, and then heat-treated.

The carbonaceous material of the present invention may be obtained by gradually heating the polyimide polymer to 400° to 1,400° C., preferably 500° to 1,200° C. in a non-oxidation atmosphere or under vacuum. The non-oxidation atmosphere can be in a non-oxidation gas, such as nitrogen gas, argon gas, helium gas, neon gas, carbon dioxide gas and the like. It is preferred to heat-treat under vacuum.

The carbonaceous material of the present invention has a nitrogen/carbon atom weight ratio of 0.15 to 0.01 and has a specific surface area of at least 10 m$^2$/g, preferably 100 m$^2$/g, more preferably 200 m$^2$/g, further more preferably 300 m$^2$/g, most preferably 400 m$^2$/g. If the material is outside the above range, it has poor performance as electrode. The carbonaceous material powder has an average particle size of 500 μm or less, preferably 100 μm or less. If the particle size is more than 500 μm, the material is liable to have poor performance as electrode. The carbonaceous material of the present invention preferably has a total pore volume of at least 0.20 ml/g, more preferably at least 0.30 ml/g. The total pore volume is determined by BET method. If the total pore volume is less than 0.20 ml/g, the resulting electrode is liable to have poor performance.

The carbonaceous material of the present invention can be mixed with thermoplastic polymer (e.g. polyethylene, polypropylene, Teflon®, polyvinylidene fluoride etc.) and molded into an electrode of a secondary cell.

The present invention also provides a secondary cell which is fundamentally composed of an anode, a cathode and an electrolyte solution. A separator may be present between both electrodes, The electrolyte solution is generally composed of a solvent and an electrolyte, but may be solid.

It is possible that either or both electrodes are formed from the carbonacecous material of the present invention. For example, if it is formed into the cathode, the anode may contain as anode active materials, transition metal oxides or transition metal chalcogenates (e.g. $TiS_2$, $MoS_2$, $CoO_2$, $V_2O_5$, $FeS_2$, $NbS_2$, $ZrS_2$, $NiPS_3$, $VSe_2$, $MnO_2$ etc.), lithium composite oxides (e.g. $LiCoO_2$), heat polymerizates of organic materials (e.g. one-dimension graphitizate, fluorinated carbon, graphite etc.) and electroconductive polymers (e.g. polyacetylene, polypyrrole, polyaniline, polyazulene etc.).

It is preferred that the carbonaceous material of the present invention is contained in the cathode of the secondary cell. The cathode is preferably formed by mixing the carbonacecous material with other electroconductive materials, The other electroconductive materials are those that do not inhibit cathode electrode reaction and are insoluble to the electrode reaction. It is preferred that the other electroconductive materials have an electroconductivity of at least $10^0$ S/cm, preferably at least $10^1$ S/cm, for example including metal (e.g. nickel, titanium, copper, platinum and gold), alloy (e.g. stainless steel), inorganic metal oxide (e.g. $SnO_2$ and $Ti_2O_3$), carbon black (e.g. acetylene black), carbon material (e.g. coke, carbon fiber, electroconductive carbon and graphite) and the like. Preferred are copper powder and carbon material (e.g. electroconductive carbon and graphite) in view of electroconductivity and stability. The carbon material can either be an electrode active material having an electroconductivity of at least 1 S/cm. or simple electroconductive material. It is preferred that the electrode active material has crystal regularity, i.e. $d_{002}$ of 3.37 to 3.6 Å, and $L_c$ of at least 20 Å and $L_a$ of 100 Å. The carbonaceous material of the present invention may exhibit such regularity, if it is baked at a temperature of more than 800° C. However, as a cathode active material, the carbonaceous material which is prepared by baking at less than 800° C. is preferred because of cycle characteristics. An amount of the other electroconductive material may be 15 to 70 parts by weight, preferably 33 to 60 parts by weight based on 100 parts by weight of the carbonaceous material. Amounts of less than 15 parts by weight deteriorate electroconductivity of the cathode and those of more than 70% by weight reduce discharging capacity of the cathode.

In the secondary cell of the present invention, the cathode preferably has an electroconductivity of at least $10^{-3}$ S/cm, preferably at least $10^{-2}$ S/cm. The cell preferably has a rechargeable capacity ratio of anode to cathode of at least 1.2 times, more preferably at least 1.5 times, and limited to up to 2 times. If the cathode has an electroconductivity of more than $10^{-3}$, the electroconductivity is similar to that of the electrolyte solution and therefore the electrode reaction proceeds uniformly around the cathode. Accordingly, an internal impedance is kept low and charge, and discharge can be conducted at a high electric current density. If the rechargable capacity is within the above range, the anode always has excess electric capacity in usual charge or discharge cycle and therefore even if it is difficult to set suitable charge or discharge end voltage an anodic voltage can be kept within the permitted voltage range. Accordingly no overcharge or no overdischarge would occur at the anode and thus its recycle characteristics are superior. The control of electric capacity can be conducted by adjusting the ion absorption capacity of the anode and the cathode. Particularly, it is obtained as a ratio of carbon energy density at a discharge end 1.0 $V_{vs}Li/Li+$ against a charge end 0 $V_{vs}Li/Li+$ to anode energy density obtained as lithium being cathode.

The electrolyte (dopant) used in the secondary cell of the present invention includes, as anion, a halogenated anion of $V_B$ atoms in periodic table (e.g. $PF_6-$, $SbF_6-$, $AsF_6-$, $SbCl_6-$), a halogenated anion of $III_a$ atoms in the periodic table (e.g. $BF_4-$, $BR''_4-$ wherein $R''$ represents a phenyl group or an alkyl group), a perchlorate anion (e.g. $ClO_4-$), a halogen onion (e.g. $Cl-$, $Br-$, $I-$), trifluoromethanesulfonic acid; as cation, an alkali metal anion (e.g. $Li+$, $Na+$, $K+$), $(R'''_4N)+$ wherein $R'''$ is a hydrocarbon group having 1 to 20 carbon atoms); and the like.

Examples of the compound providing the above mentioned dopant are $LiPF_6$, $LiSbF_6$, $LiAsF_6$, $LiClO_4$, $KPF_6$, $NaClO_4$, $KI$, $KSbF_6$, $KAsF_6$, $KClO_4$, $[(n-Bu)_4N]+AsF_6-$, $[(n-Bu)_4N]+BF_6-$, $LiAlCl_4$, $LiBF_4$, $LiCF_3SO_3$ and the like. Preferred are $LiClO_4$, $LiPF_6$ and $LiBF_4$.

The solvent contained in the electrolyte solution is not limited, but preferably is one having relatively high polarity. Examples of the solvents are propylene carbonate, ethylene carbonate, benzonitrile, acetonitrile, tetrahydrofuran, 2-methyltetrahydrofuran, $\gamma$-butyl lactone, dioxolane. triethylphosphite, dimethyl formamide, dimethyl acetamide, dimethyl sulfoxide, dioxane, dimethoxyethane, polyethylene glycol, sulforane, dichloroethane, chlorobenzene, nitrobenzene, mixtures thereof and the like. Preferred are propylene carbonate, ethylene carbonate, dimethoxyethane and mixtures thereof.

The separator may be one which does not show any resistance to ion transference in the electrolyte solution and which is stable therein. Examples of the separators are glass fiber filter; polymer pore filter (e.g. polyester, Teflon ®, Polyfulon, polypropylene); non-woven fabric of glass fiber and the above mentioned polymer; and the like.

Instead of the electrolyte solution and separator, a solid electrolyte may be used for the cell of the present invention. Examples of such solid electrolytes are metal halides (AgCl, AgBr, AgI, LiI; $PbAg_4I_5$, $PbAg_4I_4CN$; a composite of a polymer matrix (e.g. polyethylene oxide, polypropylene oxide, polyvinylidene fluoride, polyacrylamide) with the above mentioned electrolyte salts; gelled article thereof; polymer solid electrolyte prepared by grafting, a polymer backbone with ion releasing groups (e.g. low molecular weight polyethylene oxide, crown ether); and the like.

Secondary cells can be classified into a variety of types, such as coin type, sheet type, cylinder type, gain type and the like, but the cells of the present invention can be used as all of these cells.

BRIEF EXPLANATION OF DRAWING

FIG. 1 is a sectional view of a sample cell of Example 8.

EXAMPLES

The present invention is illustrated by the following examples which, however, are not to be construed as limiting the present invention to their details.

EXAMPLE 1

An aromatic polyimide film (available from Toray Dupont Company as Captone, obtained by the condensation reaction of pyromellitic anhydride and diaminodiphenyl ether) was put in a vacuum furnace (available from Fuji Denpa Kogyo K.K.), and heated at a heating speed of about 30° C./time to a predetermined temperature shown in Table 1. It was then heat-treated at the predetermined temperature for 3 hours to obtain carbonaceous materials 1 to 4.

Nitrogen/carbon atom weight ratio and specific surface area of the resulting materials were measured and the results are shown in Table 1.

TABLE 1

|  | Temperature for heat treatment (°C.) | Nitrogen/ carbon atom ratio | Specific surface area* ($m^2/g^2$) |
|---|---|---|---|
| Polyimide film | — | 0.116 | 1.30 |
| No. 1 | 800 | 0.061 | 40.5 |
| No. 2 | 670 | 0.081 | 465.8 |
| No. 3 | 630 | 0.087 | 489.0 |
| No. 4 | 600 | 0.090 | 530.3 |

*Measured by Bel Sorp 28 (available from Nippon Bel Company.

EXAMPLE 2

Preparation of Electrode Active Material

A one liter three neck flask was charged with 500 g of 5.5N diluted sulfuric acid, to which 20 g of aniline was dissolved. To the content, a solution of 200 g of water and 20 g of ammonium persulfate was added dropwise at 5° C. for 30 minutes, and then mixed for another 2 hours at 5° C. The resulting dark green precipitate was filtered, and rinsed with methanol, followed by vacuum-drying at 30° C. for 12 hours to obtain 8 g of polyaniline powder.

Preparation of Electroconductive Polymer Electrode

Ten liter of water was mixed for 5 minutes with 5 g of the resulting electrode active material, 1 g of glassy carbon (available from Unitika Ltd. as GCP-10H) and 0.5 g of polyester fiber, and then formed into sheet by a sheet machine (available from Kumagai Riki Kogyo K.K.). The resulting sheet was vacuum-dried at 30° C. for 12 hours and then compression-molded at 120° C. and 100 Kg/$cm^2$ for 60 second to obtain an electroconductive polymer electrode with 0.8 mm thickness, 6 Kg/$cm^2$ flexural strength, 75% pore rate and 260 mm$H_2O$ pressure loss.

Preparation of Lithium Secondary Cell

A CR-2016 type lithium secondary cell was prepared using as cathode the carbonaceous material obtained in Example 1, as anode the above polymer electrode and as electrolyte solution a propylene carbonate (PC) solution containing one M of $LiClO_4$. The performance of the cell was evaluated by charging and discharging at 2.5 to 3.7 volt and 1 mA. The results are shown in Table 2.

TABLE 2

|  | No. 1 | No. 2 | No. 3 | No. 4 |
|---|---|---|---|---|
| Voc | 3.30 | 3.30 | 3.30 | 3.30 |
| Ah capacity (mA) |  |  |  |  |
| 50 cycles | 4.8 | 5.1 | 5.9 | 6.7 |
| 100 cycles | 4.6 | 4.8 | 5.8 | 6.4 |

PRODUCTION EXAMPLE 1

Fifteen gram of 4,4'-diaminodiphenyl ether was dissolved in 300 ml of DMAc (dimethylacetamide), to which 16.4 g of pyromellitic dianhydride was added and mixed at 30° C. for one hour. The resulting solution was added to 1,000 ml of chloroform to precipitate polyamide acid powder. It was filtered and rinsed with 1,000 ml of methanol three times, and then dried under a reduced pressure at 35° C. to obtain 29.9 g of polyamide acid powder. It was cured at 200° C. for 24 hours to obtain 20 g of polyimide polymer powder.

EXAMPLE 3

The polyimide polymer powder of Production Example 1 was put in a vacuum furnace (available from Fuji Denpa Kogyo K.K.), and heated at a heating speed of about 30° C./time to a predetermined temperature shown in Table 3. It was then heat-treated at the predetermined temperature for 5 hours to obtain carbonaceous powder 5 to 8.

Total pore volume, specific surface area and average particle size of the resulting powder were measured and the results are shown in Table 3.

COMPARATIVE EXAMPLE 1

The polymer powder of Production Example 1 was heated as generally described in Example 3 to obtain carbonaceous powder 9 and 10.

TABLE 3

|  | Temp. of heat treatment (°C.) | Total pore volume (ml/g) | Specific surface area ($m^2/g$) | Average particle size ($\mu$m) |
|---|---|---|---|---|
| No. 5 | 750 | 0.296 | 252.1 | 30 |
| No. 6 | 600 | 0.305 | 465.8 | 32 |
| No. 7 | 550 | 0.310 | 473.0 | 32 |
| No. 8 | 500 | 0.320 | 491.8 | 31 |
| No. 9 | 350 | 0.040 | 5.1 | 45 |
| No. 10 | 1,500 | 0.012 | 0.9 | 25 |

Total pore volume and specific surface area were determined by Bel Sorp 28 (available from Nippon Bel Company).

Average particle size was determined by observing 100 particles from a microscope photograph of powder and calculating average particle size.

EXAMPLE 4

Nine gram of the carbonaceous powder obtained in Example 3 was dry-blended with one g of polypropylene powder and packed in a mold which was then compression-molded at 180° C. and 100 Kg/$cm^2$ for 10 minutes to obtain a molded article.

A CR-2016 type lithium secondary cell was prepared using as cathode the molded article obtained above, as anode the polymer electrode obtained in Example 2 and as electrolyte solution a polycarbonate (PC) solution containing one M of $LiClO_4$. The performance of the cell was evaluated by charging and discharging at 2.5 to 3.7 volt and 1 mA. The results are shown in Table 4.

TABLE 4

| | 50 cycles | 200 cycles |
| --- | --- | --- |
| No. 5 | 4.5 | 4.3 |
| No. 6 | 5.2 | 4.9 |
| No. 7 | 6.0 | 5.9 |
| No. 8 | 5.3 | 5.0 |
| No. 9 | 0.08 | 0.02 |
| No. 10 | 0.04 | 0.01 |

EXAMPLE 5

The carbonaceous powder No. 7 obtained in Example 3 was mixed with graphite and Teflon ® in an amount ratio of carbonaceous powder/graphite/Teflon ® of 6/3/1, and molded at a pressure of 2 t/cm² to form a cathode. The cathode had a electroconductivity of $4\times10^{-3}$ S/cm. The cathode was attached to 200 mesh SUS 304 metal net and used as action electrode. Lithium was employed as cathode and reference electrode and 3M LiClO₄/propylene carbonate solution was used as electrolyte solution. Then, discharge capacity of the cathode was measured. Charge was conducted at 0.1 volt for 10 hours and discharge was conducted until 2.5 volt at 0.2 mA/cm². The discharge capacity per unit weight of the cathode was 290 mAh/g.

EXAMPLE 6

The electrode of Example 5 was attached to 200 mesh SUS 304 metal net and used as cathode. LiCoO₂, graphite and Teflon ® were mixed at an amount ratio of respectively 7:2:1, and then molded at 2 t/cm²and then attached to 200 mesh SUS 304 metal net, which was used as anode. An electrolyte solution was 3.5M LiClO₄/(propylene carbonate+dimethoxyethane at volume ratio of 7:3) and a separator was microporous polypropylene. Using the above, a 2016 type coin cell was prepared. A discharge capacity was measured by charging and discharging at 2 to 4.1 volt and 0.5 mA. The discharge capacity was 14.8 mAh and the cell showed good cycle properties.

EXAMPLE 7

A 2016 type coin cell was prepared as generally described in Example 6, with the exception that the anode was one that is prepared by mixing polyaniline and 20% graphite and then attached to 200 mesh SUS 304 metal net at a pressure of 2 t/cm². A discharge capacity was measured by charging and discharging at 2 to 4.1 volt and 0.5 mA. The discharge capacity was 6.2 mAh and the cell showed good cycle properties.

EXAMPLE 8

| Ingredients | Parts by weight |
| --- | --- |
| Carbonaceous powder 6 of Example 3 | 65 |
| Graphite powder | 35 |
| Teflon ® powder*¹ | 5 |

*¹30J available from Mitsui Dupont Chemical Company.

The above ingredients were mixed and molded at 2 t/m², and then attached to 200 mesh SUS 304 metal net. The resulting molded article was blanked to a circle having a diameter of 16 mm and used as cathode.

Separately, polyaniline and 20% graphite was mixed and molded at 2 t/cm² and attached to 200 mesh SUS 304 metal net. It was then blanked to a circle having a diameter of 16 cm and used as anode.

The above cathode and anode were formed into a sample cell as shown in FIG. 1, wherein an electrolyte solution was 3.5M LiClO₄/(propylene carbonate+dimethoxyethane at 7:3 volume ratio) and a separator was microporous polypropylene. Using the cell, a discharge capacity was measured by charging and discharging at 1.8 to 3.6 volt and 0.5 mA. In FIG. 1, 1 is the anode, 2 is the cathode, 3 is an anode terminal, 4 is a cathode terminal, 5 is the separator and 6 is fluorine resin.

What is claimed is:

1. A carbonaceous material having a specific surface area by BET method of at least 10 m²/g and a nitrogen/carbon atom weight ratio of 0.15 to 0.01, obtained by heat-treating a polyimide polymer having repeating units represented by:

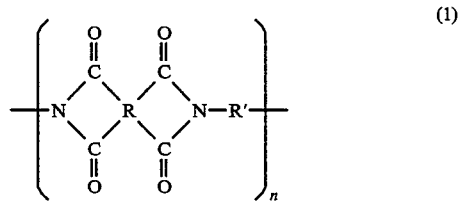

(1)

wherein R represents a 4 valent aromatic residue having at least one aromatic ring, of which each 2 valences are bonded with an adjacent carbon atom in the aromatic ring, R' represents a divalent aromatic residue having 1 to 4 aromatic rings and n is an integer of at least 2.

2. The carbonaceous material according to claim 1 wherein said specific surface area is at least 100 m²/g.

3. The carbonaceous material according to claim 1 wherein said specific surface area is at least 200 m²/g.

4. The carbonaceous material according to claim 1 wherein said specific surface area is at least 300 m²/g.

5. The carbonaceous material according to claim 1 wherein said specific surface area is at least 400 m²/g.

6. The carbonaceous material according to claim 1 having an average particle size of 500 μm or less.

7. The carbonaceous material according to claim 1 having a total pore volume of at least 0.20 ml/g.

8. A secondary cell using as cathode a carbonaceous material absorbing or releasing a cation, wherein said carbonaceous material is that set forth in any one of claims 1-7.

9. The secondary cell according to claim 8 wherein said cell has an anode, and a rechargeable electric capacity ratio of anode to cathode is 1.2 times or more.

10. The secondary cell according to claim 9 wherein said anode is formed from electroconductive polymer material.

11. A secondary cell using as cathode a carbonaceous material absorbing or releasing a cation, wherein said carbonaceous material is that set forth in any one of claims 1-7, and has an electroconductivity of $10^{-3}$ or more.

12. The secondary cell according to claim 11 wherein said cathode is prepared from 100 parts by weight of the carbonaceous material, and 15 to 70 parts by weight of other electroconductive materials.

13. The secondary cell according to claim 10 wherein said anode is LiCoO₂.

14. The carbonaceous material according to claim 1 wherein said heat-treating is conducted at 400° to 1,400° C., in a non-oxidation atmosphere or under vacuum.

15. The carbonaceous material according to claim 1 wherein said heat-treating is conducted at 500° to 1,200° C., in a non-oxidation atmosphere or under vacuum.

* * * * *